July 30, 1946.  J. V. MARTIN  2,404,974
STEEL SPRING SPOKE TIRE
Filed April 7, 1942   2 Sheets-Sheet 1

Inventor
James V. Martin

By
Geo. V. Martin
Attorney

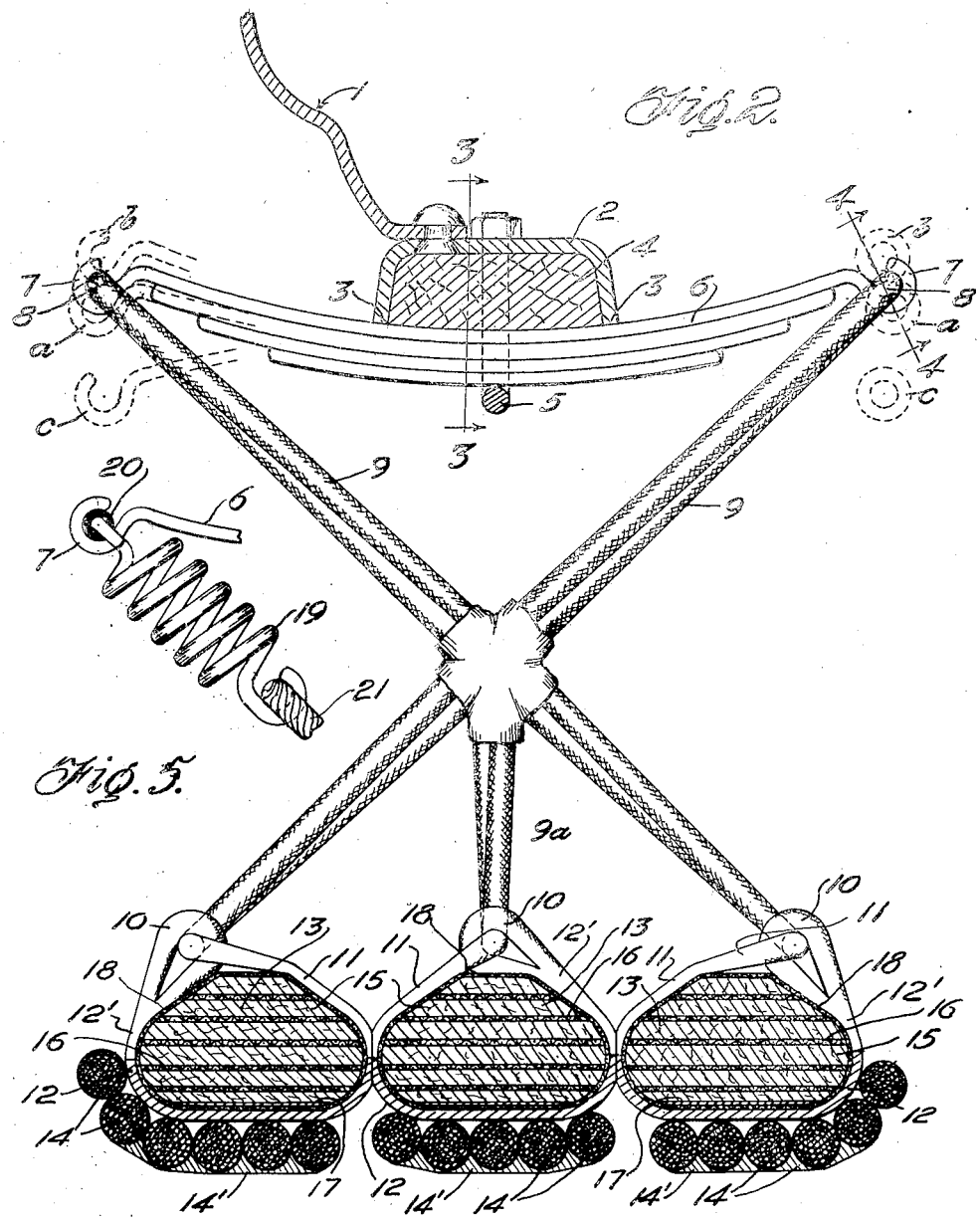

Patented July 30, 1946

2,404,974

UNITED STATES PATENT OFFICE 2,404,974

STEEL SPRING SPOKE TIRE

James V. Martin, Rochelle Park, N. J.

Application April 7, 1942, Serial No. 438,031

3 Claims. (Cl. 152—252)

This invention relates to tires for road vehicles, aeroplanes and military vehicles and aims to produce a serviceable tire without the use of any rubber whatever in its composition.

The primary object is to obtain a light weight, resilient road contacting tire portion so spaced apart from the vehicle wheel that none of the wheel or vehicle's loads can be impinged directly nor severely upon the tread portion; this may well be called the first principle of tread durability for without applying this principle early tread deterioration can be expected regardless of tread materials.

Another related object is to place the means I employ to obtain resiliency as near the wheel as possible, so that little flywheel action or gyroscopic force will result from high velocities of the tire, while never-the-less the actual resiliency itself will be available far outward where the tread portion of the tire exists.

A still further object is to provide a tire which readily attaches to the central part of the drop center rim of present auto wheels and one having ample lateral strength although made of comparatively cheap materials in order to permit American vehicles to operate at normal speeds and with great safety in spite of the war occasioned rubber shortage.

Other objects will appear as I proceed to describe the tire in relation to the several views of the drawings:

Fig. 2 is a view in section along the line 2—2 of Fig. 1 and showing in addition certain tape means of binding the cords together.

Fig. 5 shows an alternative arrangement.

Figure 1:
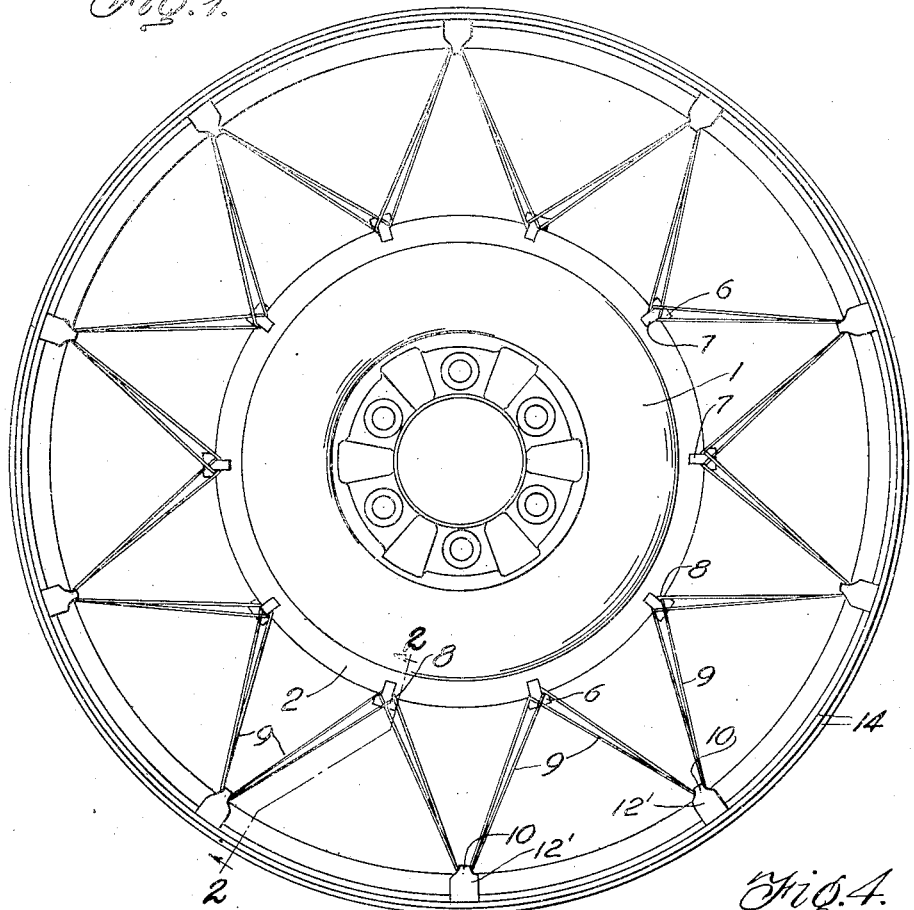
Fig. 1 shows my invention as applied to a conventional automobile wheel and rim; side elevation.
Figure 3:
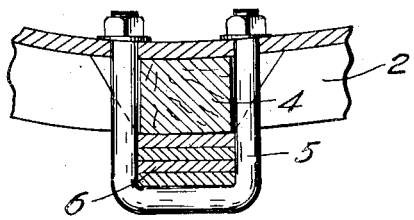
Fig. 3 is a view partly in section taken along the line 3—3 of Fig. 2.
Figure 4:
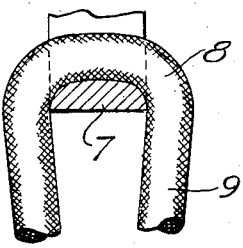
Fig. 4 is an enlarged view partly in section taken along the line 4—4 of Fig. 2.

Proceeding with the more detailed description of my invention I shall employ like numerals to represent similar parts throughout the several views: 1 indicates a typical automobile wheel, being the stamped spider thereof, while 2 indicates the drop center portion of a conventional inflated tire rim; the portions of such conventional rim which are not needed when employing my non-rubber tire have been cut off at the position indicated by 3, see Fig. 2.

To afford a firm foundation for my resilient non-rubber tire I insert hard wood or fibre blocks 4 at ten intervals within the U shaped drop center channel 2 and by means of a U-bolt 5, I clamp in transverse positions over each said block a four leaf steel spring 6. The innermost of the spring leaves is bent into a hook form 7 which is adapted to hold a loop 8 of a flexible, but non-elastic cord 9 which extends diagonally and outwardly to certain tread-hoop connections 10 also in loop form: After passing through the loop 10 the two portions 9 of the loop 8 merge at 11 into a tread carrying wrapper 12 and the loops 10 grow out of this same wrapper 12 at 12' on the opposite sides of the tread hoops 13. Affixed to the tread-hoop wrapper 12 are tread ropes 14 of chemically treated istle or other suitable fibre.

The secret of obtaining a serviceable, resilient non-rubber tire does not reside chiefly in the selection of novel materials, but in the disposition and arrangement of materials already often proposed for use in connection with tires.

Thousands of efforts to create a roadable substitute for the inflated rubber tire having thus far failed, a full disclosure of my invention should include a brief description of the essentials I supply which have been missing in proper combination in prior efforts: For example of first importance is the matter of comparative total weight and second the relative disposition of that weight.

I employ steel springs 6 to afford resiliency to my tire, these are of metal and metal is relatively heavy, but it will be noted that I use only ten of these springs to yieldably attach 20 loops, see 9 of Fig. 1, also see loops 7 in my earlier Patent No. 1,954,214, April 10, 1934, and the amount of metal cut off of the inflated tire drop center rim at 3 off-sets the weight of these springs both as to amount of weight and also as to distance of weight location from the wheel center.

(For a comparison see typical drop center wheel rim 23 of Fig. 11, in my prior Patent No. 2,235,378, March 18, 1941.)

Having in this way supplied the third requisite, resiliency, for a roadable tire and keeping the weight down and placed not too far from the wheel center I must now, without excessive weight transfer the resiliency to the periphery or outermost tread portion of the tire: That is the essential place where the resiliency must be had, but if the weight needed to obtain such resiliency were placed far outwardly from the wheel center gyroscopic and flywheel action would render the tire dangerous at high speeds and also such weight, being immediate to the tread, would give the tread concentrated instead of diffused loadings of impact at speed and lessen the tread life regardless of what materials might be employed for the tread.

This diffusing of load imparted to the tread, which I classify as another essential of a roadable tire, I obtain by employing very flexible tread hoops 13, preferably made up of laminations of hickory or plastic layers 15 cemented to layers of fabric 16 and having an outer layer of exceedingly thin spring steel 17 also bonded firmly to the outer layer of hickory and the whole firmly wrapped and bonded within and to an envelope 18 of fabric especially treated for weather resistance after the fashion of treating marline. Also cemented to this wrapping of the tread fillers 13 and over the outside of the wrapper 18 I cement a partial cover 12 which has the ropes 14 sewn and cemented to it and which is continuous along the entire bottom portions of the tread hoops 13, and merges into the loop cords 9 at 11 and 12'.

The loops thus formed also tend to bind tightly the cover 12 around the inner wrapper 18 and thus I have a very light weight structure connected by the cords 9 to the springs 6.

I avoid the destructive imposition of direct loads to the tread in at least two ways; first, since the hoops themselves are flexible, half or more of their own weight may be considered as "sprung," i. e. their upper half weight reaches the actual tread contact with the road through a flexing member, secondly, since the cords 9 are flexible they refuse to carry any axle loads directly downward to the tire tread and the only way they do impart such axle or vehicle loads is even more indirectly than by means of an inflated tire, i. e., through tension from the upper portions of the said hoops and only after the steel springs have yieldably delivered their loads to the cords 9 for transfer of yieldable motion to the flexible tread hoops.

There is a fifth essential for safety in any tire and that is lateral strength, which I attain by means of the diagonal crossing of the cords 9, after the manner shown in my former patents and my copending application, Serial No. 372,628, filed December 31, 1940, which matured into Patent 2,331,212, October 5, 1943. In the present case the springs 6 act almost perfectly for vertical easy motion, while preventing lateral displacement, i. e., the range of vertical movement is comparatively vast (see b to c of Fig. 2), while the lateral movement permitted is infinitesimal; note that the movement of the spring hook 7 from b to a swings in an outward arc.

The preferred arrangement for assembling my non-rubber tire is to adjust the cords 9 in length and the spring 6 in strength so that when the full static load is imposed on the wheel and tire the topmost springs 6 take the position indicated in Fig. 2 at a.

The full line position 7 of the spring end or hook is the unloaded tire position with enough initial tension to pull all of the springs from their relaxed position b. This initial tension is put into the tire on assembly and it should be clearly noted that neither the cords 9 nor the springs 6 are part of the vehicle wheel.

The wheel is complete having a hub, not shown, to which the disc or spider is demountably mounted in conventional fashion and a wheel rim 2 which is the outermost part of any proper wheel. The wheel including its rim is of the rigid or non-resilient type. A hub cap is usually fitted on the outside (left hand portion of Fig. 2) while the space for the brake is on the right upper direction of Fig. 2.

Thus the tire proper includes the springs, cords and tread hoops which substitute as a whole for an inflated tire and are connected to the wheel rim by means of the U-bolts 5. c indicates the extreme deflected position of the spring 6, such as might occur when traveling over bumps in the road at high speed and if more range of resiliency is desired I have shown in Fig. 5 a coil spring 19 as a substitute for part or all of the cord 9 and 9a and to avoid metal to metal contacts I have provided a fibre or fabric bushing 20 and at 21 I indicate a flexible steel cable which may be substituted for the cords 9 in any of the various combinations. The spring 19 is shown under extreme tension as its normal coil position would find the coils close together.

In operation it will be observed my tire is as light and resilient vertically as an inflated tire while laterally much stronger; the lateral strength being easily regulated by designing whatever diagonal angles are desired into the tire. The chief surprise result or trick in the tire is the means by which a fine range of increasing curve resiliency is produced in the vertical plane and way out at the tire tread by means of a few steel springs placed so near the wheel center that their weight does not create destructive flywheel action and nevertheless conventional space is left for brake drum and demountable wheel bolts.

In practice if much resiliency is desired coil springs as shown in Fig. 5 may be employed, but should follow the rule about proximity to the wheel axis and be placed immediately near to hook 7 of spring 6, also all connections such as 20 should be tightly bound by adhesive tape or in some other way to prevent friction of parts.

There are a great number of materials which can be used for the cords 9 and for the treads 14, including minerals with semi-hard chemical binders, and plastics could afford an excellent substitute for the hickory strips of the laminated fillers, but for an emergency, wartime tire I have indicated inexpensive material such as the well known marline, having a tar compound over a grass base, this will pick up particles from the road to form an outside coating for the ropes 14; or it might be desirable before the tire is run to roll it over small particles of mica 14' to acquire a protective coating.

Also in assembling the tire it is best to have the outer or curb contacting edges of the tread hoops extend laterally farther outward than the ends 7 of the cross springs of the tires. The hub cap can be designed to cover the normal positions of the hooks 7.

Practice has shown that two advantages stem from the separate attachment of each leaf spring to the wheel rim; breaking of one or even two attachments allows the tire to function and thus avoids collapse and also individual replacements can be more easily made.

Having explained my invention by means of a specific embodiment it will readily be adaptable to wide changes without departing from the spirit and teachings of the invention and what I claim is:

1. In combination with a vehicle wheel and rim having a rigid relation to each other, a tire including leaf springs and a flexible tread portion, each said leaf spring attached at its center to the said rim and two coil springs attached, one at each end of the said leaf spring and flexible cables secured to said coil springs and said tread portion and carrying the wheel loads from the said rim through the said leaf and coil springs to the radially outer portions of the said tread portion.

2. A vehicle wheel rim and flexible tire tread combination wherein leaf springs are attached at spaced intervals to the said rim and arranged transversely to the rotary plane thereof, coil springs attached to flexible cords forming a tension connection between the ends of said leaf springs and the said flexible tread.

3. A wheel including a wheel rim, a tire for the said wheel having a flexible tread portion, multiple leaf springs each attached separately at its center to the said rim so that its ends extend laterally on both sides thereof and one of the said leaves of each of said springs provided with a rounded non-metallic bearing at both of its ends, a coil spring attached to each said bearing and cords leading transversely across the radial plane of the said wheel from said coil springs to the said tire tread portion.

JAMES V. MARTIN.